3,651,130
PROCESS FOR THE PRODUCTION OF
ACETOACETIC ACID ESTERS
Othmar Marti and Willi Zimmerli, Visp, Valais, Switzerland, assignors to Lonza, Ltd., Basel, Switzerland
No Drawing. Filed July 25, 1968, Ser. No. 747,467
Int. Cl. C07c 69/72
U.S. Cl. 260—483     6 Claims

ABSTRACT OF THE DISCLOSURE

An improved yield of an acetoacetic acid ester is obtained from a reaction between diketene and an alcohol in the presence of an acid catalyst, by converting the β-alkoxycrotonic acid ester, which is formed as secondary product in the reaction, into the corresponding acetoacetic acid ester by heating it with water.

---

This invention relates to a process for the production of acetoacetic acid esters.

It is known that acetoacetic acid esters can be prepared by reacting diketene with alcohols, lower aliphatic alcohols in particular, in the presence of acid catalysts.

It is also known that diketene, an alcohol and a catalyst may be introduced into the product of reaction of these same materials, heated to the reaction temperature, which comprises acetoacetic acid ester and β-alkoxycrotonic acid ester and which acts both as reaction medium and as diluent. The esterification reaction takes place at temperatures between 90° C. and the boiling point of the acetoacetic acid ester formed in the presence of acid esterification catalysts, for example sulphuric acid, phosphoric acid and/or sulphonic acids, which are advantageously used in a ratio of 1 mol per 300–600 mols of diketene. The secondary products formed, boiling at temperatures below the reaction temperature, and unused alcohol are separated off from the reaction product formed by distillation during the reaction.

One major disadvantage of this process is that β-alkoxycrotonic acid ester is formed in appreciable quantities as secondary product.

The present invention relates to a process for the production of acetoacetic acid esters in high yields in which a large proportion at least of the β-alkoxycrotonic acid ester formed during the reaction is converted into the corresponding acetoacetic acid ester.

The present invention, therefore, provides a process for the production of acetoacetic acid esters which comprises reacting diketene with an alcohol in the presence of an acid catalyst and a reaction medium, and a β-alkoxycrotonic acid ester which is formed as secondary product in the reaction product is converted with water into the corresponding acetoacetic acid ester.

The invention also relates to a process for the production of acetoacetic acid esters in high yields in which the unconverted residue of the β-alkoxycrotonic acid ester is recycled into the reaction medium.

According to the invention, an acetoacetic acid ester is prepared by reacting diketene with an alcohol in the presence of an acid catalyst and a reaction medium by a process in which at least some of the β-alkoxycrotonic acid ester formed as secondary product in the reaction product is converted with water in the corresponding acetoacetic acid ester, and all the acetoacetic acid ester is recovered by distillation.

The molar ratio of water required to convert the alkoxycrotonic acid ester is at most 3:1, preferably 1:1, related to the β-alkoxycrotonic acid ester in the course of formation or already formed.

The starting materials are introduced, either separately or in admixture, into a reaction medium which is preferably the reaction products of diketene and an alcohol. If the starting materials are mixed before introduction into the reaction medium, the mixing is with advantage carried out at temperatures low enough for no reaction to take place, for example at a temperature from 10 to 40° C. Aliphatic alcohols, for example methanol, ethanol and isopropyl alcohol, are the alcohols reacted with the diketene. Diketene and alcohol are preferably reacted in such a ratio that, on the one hand, the acetoacetic acid ester is formed whilst, on the other hand, the β-alkoxycrotonic acid and acetic acid formed as secondary products are esterified. The most suitable excess of alcohol to diketene is less than 15 mol percent.

Suitable catalysts include, for example, sulphuric acid, phosphoric acid, and sulphonic acids such as p-toluene sulphonic acid. They are used with advantage in quantities of 1 mol to 300–600 mols of diketene.

Esterification takes place at a temperature between 90° C. and the boiling point of the reaction mixture. Depending on circumstances, it may be carried out at reduced pressure, at atmospheric pressure or at elevated pressure.

The heat required to maintain, and optionally to reach the reaction temperature and to separate the readily volatile secondary products from the reaction product, is supplied by the exothermic reaction between diketene and alcohol.

The optimal reaction conditions are maintained by accurately dispensing suitable amounts of the as yet unreacted starting mixture into the warm reaction product. The process according to the invention is preferably carried out by introducing 1 liter/hour of the alcohol/diketene starting mixture and optionally 0.002 to 0.005 liter of water into 0.3 to 0.7 liter of reaction medium.

The process may be carried out either continuously or in batches.

The invention may be put into practice as described below for the purposes of a better understanding.

A starting mixture is formed continuously at room temperature by mixing diketene, an alcohol and an acid catalyst and is introduced continuously into a still which is provided with a rectification column, is kept at the reaction temperature and contains the reaction product as reaction medium. On the one hand, acetoacetic acid ester and β-alkoxycrotonic acid ester are formed whilst, on the other hand, the readily volatile secondary products accumulating during the reaction, for example acetic acid ester, acetone and the water formed during the formation of β-alkoxycrotonic acid ester are distilled off from the head of the column with unreacted alcohol at a temperature from 50 to 80° C. According to one embodiment of the invention, water may be added during esterification. In this instance, the alkoxy crotonic acid ester formed by the elimination of water from acetoacetic acid ester is hydrolysed and the equilibrium is displaced in favour of the acetoacetic acid ester. The product left behind in the still, comprising acetoacetic acid ester, almost involatile materials and the catalyst is continuously run off and then, if desired, subjected to a subsequent reaction, for example by heating at 90 to 140° C. for 1 to 20 minutes, so that any unreacted diketene is able to react completely.

In a preferred embodiment of the process according to the invention, diketene, an alcohol and a catalyst are introduced into the reaction product of a reaction between the same materials as reaction medium, which is kept at a temperature between 90° C. and the boiling point and which comprises acetoacetic acid ester and β-alkoxycrotonic acid, and at the same time the secondary products formed boiling below the reaction temperature and the unreacted alcohol are separated by distillation. After the catalyst and resinification residues have been distilled off, the reaction product is subjected to rectification in the presence of water, the β-alkoxycrotonic acid ester being hydrolysed into acetoacetic acid ester and all the acetoacetic acid ester being recovered.

The first and last runnings from rectification, which may still contain β-alkoxycrotonic acid ester, may with advantage be recycled into the starting mixture.

It is possible in this way not only to operate at such temperatures that high reaction velocities are obtained, making the use of fairly small apparatus possible, but also to keep the residence time in the reaction zone at elevated temperature so short that there are no appreciable losses in yield through polymerisation or decomposition reactions involving the heat-sensitive starting materials or end products, nor is the acetoacetic acid ester hydrolysed into acetoacetic acid or dissociated. The process is particularly suitable for fully continuous operation, although it may readily be carried out in batches.

EXAMPLE 1

A mixture of 1690 g. of diketene (97 to 99.5% pure), 675 g. of methanol and 3.4 g. of concentrated sulphuric acid is continuously introduced hourly into 1000 cc. of reaction product preheated to 125° C. (crude acetoacetic acid methyl ester, 92 to 95%) in a reaction still equipped with a fractionating column, corresponding to a feed rate of about 40 cc./min. The temperature is kept constant at 125° C., without external heating, by means of the heat generated by the reaction. At the same time, 68 g. per hour of a readily boiling mixture comprising about 40% of acetone, 40% of methyl acetate, 20% of methanol and a little water, are run off from the head of the fractionating column at 50 to 60° C. The heat required to heat the starting mixture to the reaction temperature and to distill the readily volatile secondary products is supplied externally at the outset. External heating is stopped when the reaction between the alcohol and diketene has supplied sufficient heat for heating the starting mixture and for distillation.

The reaction mixture running off passes through a post-reaction system where the components react completely at a temperature of about 100° C. and for an average residence time of some 10 minutes. 2305 g./hour of crude ester containing 95% of acetoacetic acid methyl ester are obtained. A 99.9% pure ester free of acid can be obtained from this crude ester in a single fractionation following the addition of 12 g. of water in vacuo.

EXAMPLE 2

As described in Example 1, 1690 g. of diketene are reacted with 675 g. of methanol in 1000 cc. of reaction product to form acetoacetic acid methyl ester. 2305 g./hour of crude ester are obtained, 95% of which is acetoacetic acid ester and 4% is α-methoxycrotonic acid methyl ester. If the crude ester is then rectified, acetoacetic acid methyl ester is obtained in a purity of 99.5% in a total yield of 87%. If the crude ester is rectified, and 13 g. of water added to the sump product enriched to about 20% with β-methoxycrotonic acid methyl ester, the acetoacetic acid methyl ester is obtained in a yield of 89% and a purity of 99.5%.

EXAMPLE 3

Diketene, ethanol and sulphuric acid are mixed in a ratio by weight of 72:39:0.3 at a temperature of 20° C. and the resulting mixture, having been combined with 100 l./h. of first and last runnings from the pure-ester rectification column, fed at a rate of 325 kg./h. into a reaction vessel comprising a still with a rectification column having 7 theoretical plates. The still contains 200 liters of reaction mixture which is kept at 130° C. by heating. Approximately 18 kg./h. of first runnings, comprising 40% of acetone, 40% of ethyl acetate, 15% of ethanol and a little water, are run off from the head of the column. The crude ester formed is transferred from the sump of the reaction column to a separation column which has a head temperature of 100° C. and a still temperature of 110° C. and in whose sump the catalyst and any resins formed are retained whilst the ester is run off from the head. The head fraction, of which 92% is acetoacetic acid ethyl ester and 6% is β-ethoxycrotonic acid ethyl ester, is fed to a continuous rectification column for purification, 2.9 l./h. of water being simultaneously introduced at a lower end of the rectification column with 5 theoretical plates. The last runnings separated off at about 80 l./h. comprise 88% of acetoacetic acid ethyl ester and the first runnings comprise 90% of acetoacetic acid ethyl ester. 290 kg./h. of highly pure acetoacetic acid ethyl ester (99.5%) are obtained at the third plate from the head of the column, corresponding to a yield of 89%, based on diketene.

We claim:

1. In a process for preparing an ester of acetoacetic acid by reacting diketene and an aliphatic alcohol in the presence of an acid catalyst, the improvement which consists of increasing the yield of the ester of acetoacetic acid by hydrolyzing with water an ester of β-alkoxycrotonic acid formed as a secondary product in the reaction between said diketene and said alcohol, said water used to hydrolyze said ester of β-alkoxycrotonic acid being present in a molar ratio of water to β-alkoxycrotonic acid ester of up to and including 3:1.

2. A process according to claim 1, wherein diketene is reacted with said alcohol at a temperature between about 90° C. and the boiling point of the reaction mixture containing diketene and said alcohol.

3. A process according to claim 1, wherein said alcohol is a lower aliphatic alcohol.

4. A process according to claim 1 wherein said water employed to hydrolyse said ester of β-alkoxycrotonic acid is present in a molar ratio of water to β-alkoxycrotonic acid of up to and including 1:1.

5. A process according to claim 1, wherein diketene is reacted with said alcohol in a reaction mixture consisting of the product of an earlier reaction between said diketene and said alcohol.

6. A process for preparing an ester of acetoacetic acid wherein diketene, an aliphatic alcohol and an acid catalyst are introduced into a mixture consisting essentially of an ester of acetoacetic acid and an ester of β-alkoxycrotonic acid, said mixture being the product of a reaction between said diketene and said alcohol, said mixture being kept at a reaction temperature between 90° C. and the boiling point of said mixture, whilst secondary products boiling below said reaction temperature are distilled off, and the reaction mixture is subsequently separated from said acid catalyst and resinified residues and subjected to rectification in the presence of water, in which rectification, said β-alkoxycrotonic acid ester is converted into acetoacetic acid ester, said water being used to hydrolyze said ester of β-alkoxycrotonic acid is present in a molar ratio of water to β-alkoxycrotonic acid ester of up to and including 3:1, and said acetoacetic acid ester is distilled out of the product of said rectification.

References Cited

UNITED STATES PATENTS

| | | | |
|---|---|---|---|
| 2,900,311 | 8/1959 | Montagna | 260—483 |
| 3,117,156 | 1/1964 | Keller et al. | 260—483 |

LORRAINE A. WEINBERGER, Primary Examiner

V. GARNER, Assistant Examiner

UNITED STATES PATENT OFFICE
CERTIFICATE OF CORRECTION

Patent No. 3,651,130　　　　　　　　Dated March 21, 1972

Inventor(s) Othmar Marti et al

It is certified that error appears in the above-identified patent and that said Letters Patent are hereby corrected as shown below:

Column 1, after line 7 should read -- Claim priority application Switzerland July 27, 1967, 10685/67 --.

Signed and sealed this 19th day of December 1972.

(SEAL)
Attest:

EDWARD M. FLETCHER, JR.　　　　　　ROBERT GOTTSCHALK
Attesting Officer　　　　　　　　　　Commissioner of Patents